US00RE39493E

(19) United States
(12) Reissued Patent
Yuschak et al.

(10) Patent Number: US RE39,493 E
(45) Date of Reissued Patent: Feb. 27, 2007

(54) RESPIRATOR HAVING SNAP-FIT FILTER CARTRIDGE

(75) Inventors: Gregory Yuschak, Hudson, WI (US); Peter O. Rekow, Woodbury, MN (US); Thomas W. Holmquist-Brown, St. Paul, MN (US)

(73) Assignee: 3M Innovative Properties Company, St. Paul, MN (US)

(21) Appl. No.: 09/030,394

(22) Filed: Feb. 25, 1998

Related U.S. Patent Documents

Reissue of:
(64) Patent No.: 5,579,761
Issued: Dec. 3, 1996
Appl. No.: 08/375,855
Filed: Jan. 20, 1995

(51) Int. Cl.
*A62B 18/08* (2006.01)
*A62B 18/00* (2006.01)

(52) U.S. Cl. ..... 128/206.17; 128/202.27; 128/201.25; 128/206.12; 128/206.28

(58) Field of Classification Search ..... 128/205.27, 128/206.16, 206.17, 201.19, 202.27
See application file for complete search history.

(56) References Cited

U.S. PATENT DOCUMENTS

| | | | | | |
|---|---|---|---|---|---|
| 2,172,544 | A | * | 9/1939 | Panter | 215/317 |
| 2,435,721 | A | * | 2/1948 | Lehmann | 128/206.17 |
| 2,505,173 | A | * | 4/1950 | Conley | 128/206.17 |
| 2,845,926 | A | * | 8/1958 | Hill | 128/206.17 |
| 2,845,927 | A | * | 8/1958 | Hill | 128/206.17 |
| 3,216,415 | A | * | 11/1965 | Littleton | 128/206.17 |
| 3,307,543 | A | * | 3/1967 | Silverman | 128/206.17 |
| 3,627,160 | A | * | 12/1971 | Horvath | 215/223 |
| 4,141,703 | A | * | 2/1979 | Mulchi | 55/316 |
| 4,228,012 | A | * | 10/1980 | Pall | 210/238 |
| 4,471,880 | A | * | 9/1984 | Taylor et al. | 220/306 |
| 4,494,538 | A | * | 1/1985 | Ansite | 128/205.25 |
| 4,501,272 | A | * | 2/1985 | Shigematsu et al. | 128/206.15 |
| 4,549,543 | A | * | 10/1985 | Moon | 128/206.12 |
| 4,562,837 | A | * | 1/1986 | Schlobohm | 128/206.17 |
| 4,592,350 | A | * | 6/1986 | Maryyanek et al. | 128/206.17 |
| 4,630,604 | A | * | 12/1986 | Montesi | 128/206.17 |
| 4,686,976 | A | * | 8/1987 | Bakkila et al. | 128/206.15 |

(Continued)

FOREIGN PATENT DOCUMENTS

| | | | |
|---|---|---|---|
| DE | 634 224 | * | 8/1936 |
| DE | 1 708 026 | * | 4/1971 |
| DE | 2 609 034 | * | 9/1977 |
| FR | 2 322 617 | * | 5/1977 |
| FR | 2 537 695 | * | 6/1984 |
| GB | 530 285 | * | 12/1940 |
| GB | 2 128 897 | * | 5/1984 |
| JP | 63-13421 | | 9/1938 |

*Primary Examiner*—Aaron J. Lewis
(74) *Attorney, Agent, or Firm*—Karl G. Hanson

(57) ABSTRACT

A respirator (10) that includes a face piece (14) and a cartridge receiving structure (22) located on the face piece (14). The face piece (14) is sized to fit snugly over the nose and mouth of a person, and the filter cartridge (12) is capable of being manually snapped into engagement with the cartridge receiving structure (22). The snap-fit can be instantaneously obtained without rotational movement of the filter cartridge (12), simply by pressing the filter cartridge (12) against the receiving structure (22).

25 Claims, 3 Drawing Sheets

U.S. PATENT DOCUMENTS 4,688,567 A * 8/1987 Kikuchi et al. ..... 128/206.15
4,771,771 A * 9/1988 Walther ..... 128/201.25
4,813,570 A * 3/1989 Pontoppidan ..... 220/306
4,850,346 A * 7/1989 Michel et al. ..... 128/206.17
4,856,508 A * 8/1989 Tayebi ..... 128/206.12
4,921,512 A * 5/1990 Maryyanek et al. ..... 55/488
4,934,361 A * 6/1990 Michel et al. ..... 128/206.17
4,945,907 A * 8/1990 Tayebi ..... 128/206.12
4,981,134 A * 1/1991 Courtney ..... 128/206.15
5,045,192 A * 9/1991 Terhune ..... 210/232
5,062,421 A * 11/1991 Burns et al. ..... 128/206.17
5,094,236 A * 3/1992 Tayebi ..... 128/206.12
5,148,803 A * 9/1992 Schlobohm ..... 128/205.27
5,186,344 A * 2/1993 Cook ..... 215/330
5,222,488 A * 6/1993 Forsgren ..... 128/206.17
5,224,474 A * 7/1993 Bloomfield ..... 128/206.17
5,226,412 A * 7/1993 Winters ..... 128/206.12
H1361 H * 10/1994 Tardiff, Jr. et al. ..... 128/206.12
5,353,789 A * 10/1994 Schlobohm ..... 128/206.24
5,372,130 A * 12/1994 Stern et al. ..... 128/205.25
5,427,090 A * 6/1995 Hipskind et al. ..... 128/205.12
5,579,761 A * 12/1996 Yuschak et al. ..... 128/206.17
5,647,356 A * 7/1997 Osendorf et al. ..... 128/206.17

* cited by examiner

RESPIRATOR HAVING SNAP-FIT FILTER CARTRIDGE

Matter enclosed in heavy brackets [ ] appears in the original patent but forms no part of this reissue specification; matter printed in italics indicates the additions made by reissue.

TECHNICAL FIELD

This invention pertains to a respirator that has a snap fit filter cartridge.

BACKGROUND OF THE INVENTION

Many techniques have been used in the respirator art to attach filter elements to respirators. A common technique has the filter element disposed in a threaded cartridge that is attached to a corresponding threaded fitting on the body of the respirator; see, for example, U.S. Pat. Nos. 5,222,488, 5,063,926, 5,036,844, 5,022,901, 4,548,626, and 4,422,861. Known filter cartridges typically possess helical or advancing spiral threads that mate with a tapped collar or socket that receives the threaded portion of the filter cartridge. Rotating the filter cartridge in an appropriate direction allows the cartridge to be attached to or removed from the respirator. A resilient, deformable gasket often is used to ensure an airtight fit to the respirator body.

In lieu of threads, a bayonet type closure has been used to attach a filter cartridge to a respirator; see, for example, U.S. Pat. Nos. 5,062,421, 4,934,361, and 4,850,346. The bayonet type closure disclosed in the '421 patent has locking tabs and notches to secure the components together. The locking tabs project from the filter cartridge and engage the notches in an aperture on the respirator body. [By rotating the filter cartridge in the appropriate direction, the cartridge snaps into engagement.] *Each notch receives a locking tab and permits the cartridge to be snapped into place and prevented from rotating.* In the '361 and '346 patents, an audible device is used to indicate that the filter cartridge is properly coupled to the respirator face piece. A lug on the face piece is provided with a detent ramp or cam having an inclined surface that is positioned to gradually deflect or deform a rib on the cartridge. As the cartridge and face piece are rotated relative to each other into a locking position, the cam engages the rib and causes the rib and lug to deflect until the rib abruptly drops off the end of the cam. The abrupt action produces the audible click.

In another technique disclosed in U.S. Pat. No. 5,148,803, a bellows is used to fasten a filter to the respirator. The bellows, together with a rigid band, form a rigid cuff which receives the filter. The cuff is continued in an elastic sleeve that surrounds the filter in a gas-tight manner. To change the filter, the sleeve is first folded back to the level of the cuff, the filter element is inserted into the cuff, and the sleeve is then folded back over the filter element.

U.S. Pat. Nos. 5,033,465 and 5,078,132 disclose a respirator that uses edge seals to secure a filter element to the respirator's elastomeric face piece. The filter element includes bonded activated carbon granules, and the edge seals are disposed between the filter element and the elastomeric face piece. The edge seals are made of a suitable adhesive material such as a hot-melt adhesive, a hot-melt foam adhesive, or a latex adhesive.

A foam mask shell is disclosed in U.S. Pat. No. 4,856,508 for receiving a filter cartridge. The foam mask shell possesses a collar that defines an opening for receiving the filter cartridge. The filter cartridge has an extension with an outside dimension approximately equal to the inside dimension of the cylindrical passage through the collar. To mount the filter cartridge, its extension is inserted into the opening where it makes a relatively tight friction fit. The mask shell is made of a flexible foam material that expands when the extension is inserted in the opening. To replace a filter element, it is grasped and twisted back and forth while pulling it away from the mask shell.

In U.S. Pat. No. 4,790,306, a respirator is described that uses insert molding to permanently secure a bonded absorbent filter element to a respirator face piece.

A plug-in frame is described in U.S. Pat. No. 4,771,771 to secure a filter cartridge in a chamber of the respirator. The filter cartridge is disposed in the chamber by seals that bear tightly against the cartridge to hold it in place. The filter cartridge can be fitted to the respirator by sliding it through an opening in the plug-in frame.

In U.S. Pat. No. 4,630,604, locking tongues are employed on a filter retainer to hold a replaceable filter member in an abutting relationship to the respirator frame. The filter member can be replaced by snapping off the filter retaining member from the frame.

A further technique is disclosed in U.S. Pat. No. 4,562,837 where the respirator is provided with a guide ring for engaging a filter housing. The guide ring is carried by a sleeve portion that defines an opening through which the glasses pass. The filter housing slides on the guide ring from a retracted stand-by position to an extended use position. A bellows, located between the filter housing and respirator, permits movement of the filter housing between its retracted stand-by position and its extended use position.

Sundström Safety AB of Lidingö, Sweden markets a respirator in Europe and Australia under the designation SR-62, which uses an elastomeric rubber filter retainer for accommodating a filter cartridge. The filter cartridge comprises a gas and vapor or particulate filter in a rigid injection molded plastic cartridge. To insert the filter cartridge into the retainer, the retainer is stretched over the filter element's periphery. When two different filters are used in series, they may be snapped together and inserted into the retainer as a single unit. To separate the filters, a tool is provided on the harness system to pry them apart.

Although the above-discussed respirators use various techniques for securing a filter and filter cartridges to respirators, these techniques have a number of drawbacks. For example, the filter cartridges that are threaded to the respirator typically include a housing or canister into which the filter material is retained. The cartridge's cylindrical geometry typically requires using the filter cartridge as an external appendage that can interfere with a wearer's vision. Further, the threaded cartridges employ many parts that add to the filter element's total volume and the respirator's overall weight. In other designs, such as disclosed in U.S. Pat. Nos. 5,078,132, 5,033,465, and 4,790,306, the filters are not able to be readily replaced, and thus when the filter element's service life has met its limit, the whole respirator is discarded as waste. In the model SR-62 respirator sold by Sundström, the filter cartridge is replaceable; however, the retainer lacks physical strength relative to the filter element, and thus, like placing a rubber tire on a wheel, a number of manipulations are needed to place the filter element in the elastomeric rubber retainer. In addition, elastomeric materials can be relatively expensive and more difficult to process. Some of the other respirators discussed above possess the drawback of using gaskets or O-rings to obtain a hermetic seal or use fairly complicated systems for mounting filter elements to respirators.

SUMMARY OF THE INVENTION

The respirator of this invention overcomes many of the drawbacks of prior art respirators. The respirator does not employ many parts to secure the filter cartridge to the respirator face piece, and there is no need for a gasket, O-ring, or permanent adhesive to obtain a hermetic fit between the cartridge and face piece. Also, the filter cartridge is relatively lightweight, and it can be mounted to and removed from the face piece in a single motion without excessive manipulation. The respirator is relatively easy to manufacture, allowing production costs to be minimized.

In brief summary, the respirator of the invention comprises:

(a) a face piece sized to fit at least over the nose and mouth of a person;

(b) a cartridge receiving structure located on the face piece; and (c) a filter cartridge that has a housing into which a filter element is contained, the filter cartridge capable of being manually snapped into engagement with the cartridge receiving structure to produce an audible noise, the engagement being instantaneously obtainable by pressing the filter cartridge against the receiving structure without rotational movement.

The present invention also includes a filter cartridge useful for filtering contaminants that are present in air that is inhaled through a respirator worn by a person. The filter cartridge permits instantaneous attachment and removal from a face piece of the respirator and comprises a housing and a filter element. The filter element is contained in the housing, and the housing includes a means for allowing the filter cartridge to be manually snapped into engagement with a cartridge receiving structure by pressing the filter cartridge against the cartridge receiving structure without using rotation movement.

The invention differs from known respirators in that the filter cartridge can be instantaneously snapped into engagement to the respirator face piece without rotational movement. This is achieved simply by pressing the first cartridge against the corresponding receiving structure on the face piece. The invention thus provides an extraordinarily easy means for attaching a filter cartridge to the respirator face piece. An audible noise is provided to indicate a secure attachment. The invention also can allow the filter cartridge to be quickly removed from a respirator face piece. This can be accomplished simply by pulling on the cartridge in a direction opposite to which it was pressed onto the face piece. Rotational movement also is not necessary to separate the filter cartridge from the respirator face piece.

The above and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

DETAILED DESCRIPTION OF PREFERRED EMBODIMENTS

In the practice of this invention, a respirator is provided that has a filter cartridge that can be manually attached to and detached from a respirator face piece without risk of leakage. The seal between the cartridge and face piece is hermetic, and attachment and detachment can be instantaneous.

Figure 1:
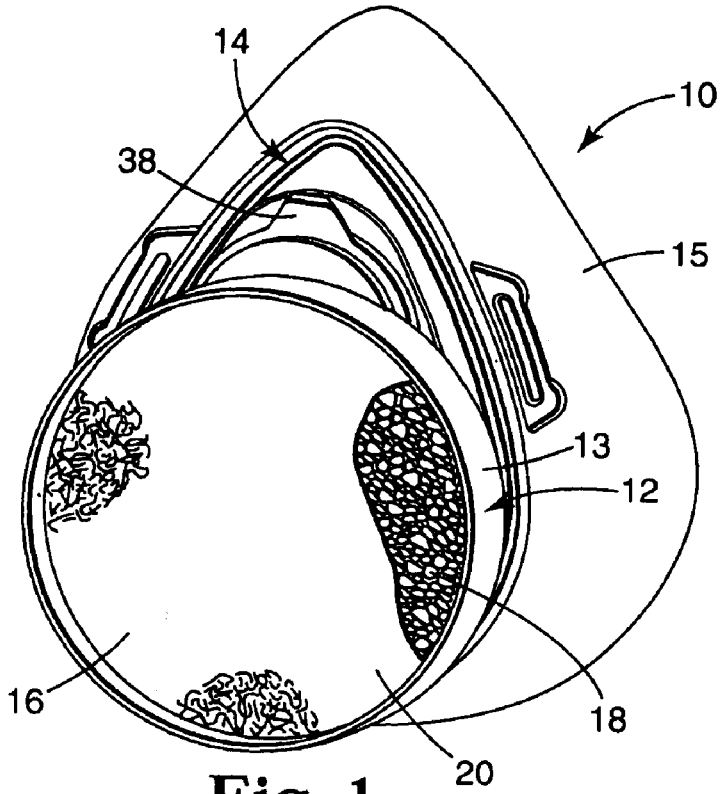
FIG. 1 is a perspective view of a respirator 10 in accordance with the invention.
Figure 2:
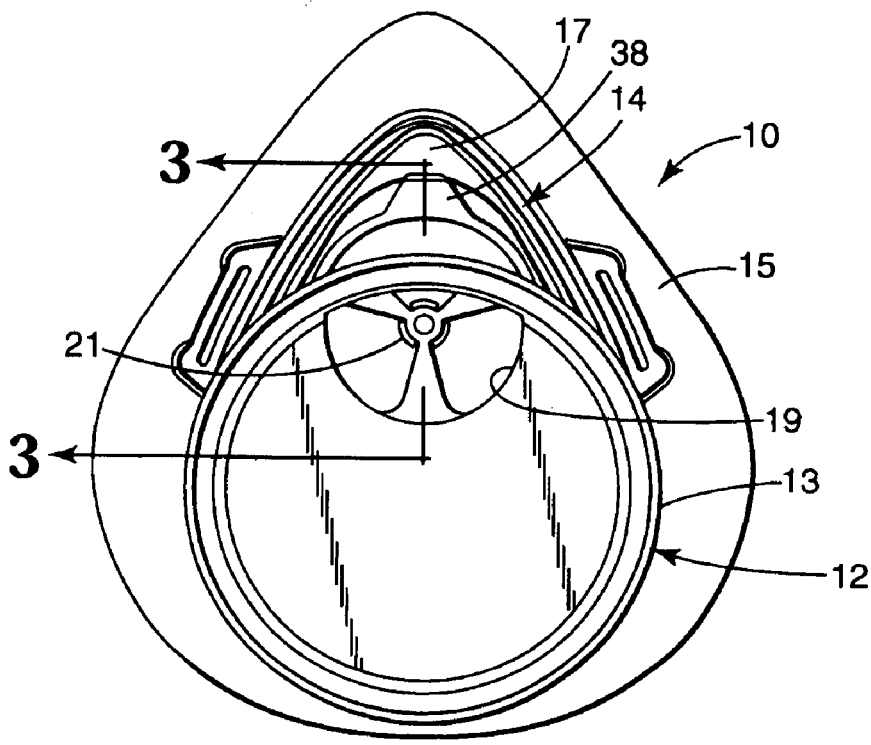
FIG. 2 is a front view of respirator 10 in accordance with the invention, without filter element 16 disposed in cartridge 12.
Figure 3:
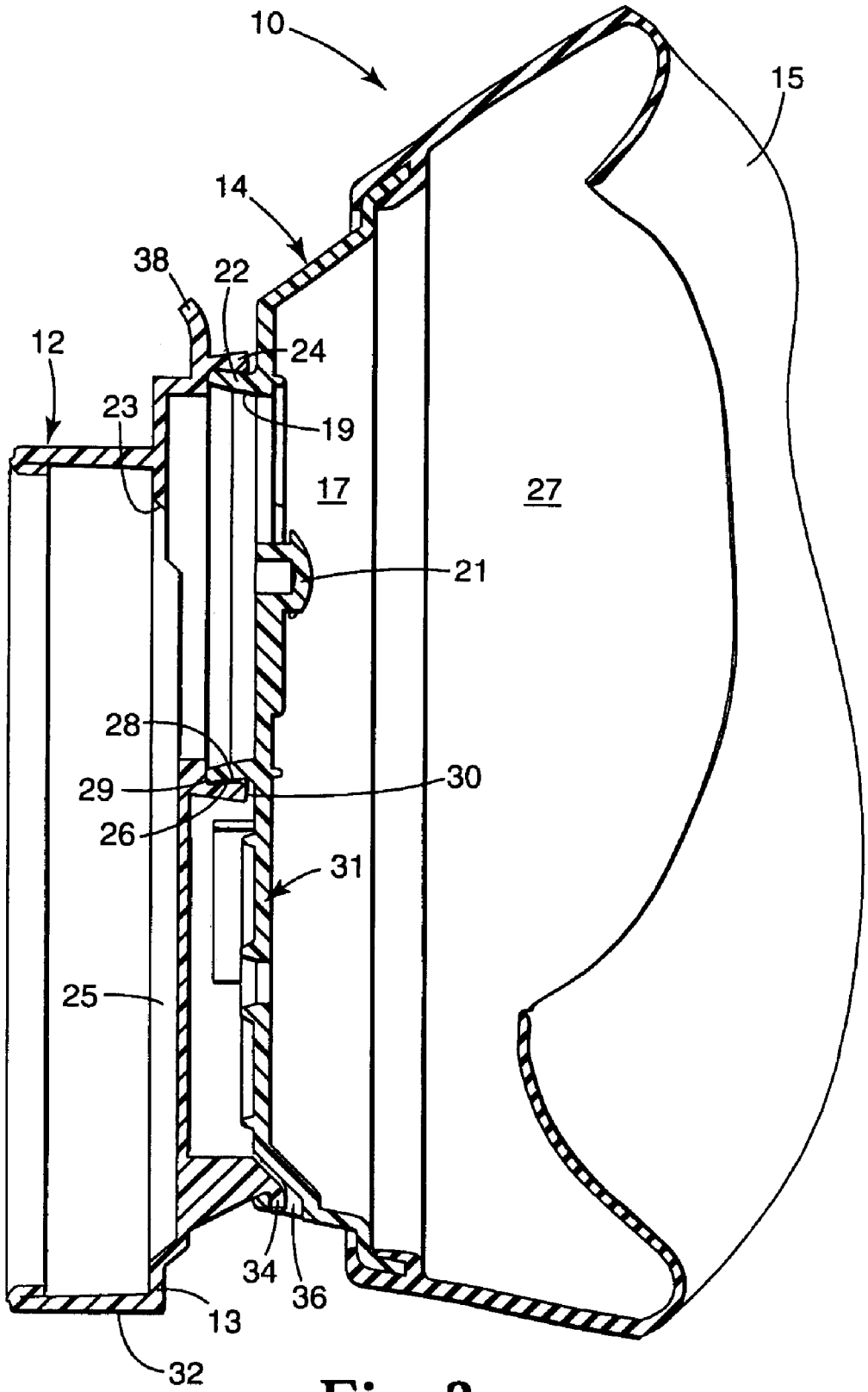
FIG. 3 is a partial cross-sectional view of respirator 10 taken along lines 3—3 of FIG. 2.

FIGS. 1, 2, and 3 illustrate a respirator 10 that comprises a filter cartridge 12 and a face piece 14. Filter cartridge 12 includes a cylindrical housing 13 that contains a cylindrical filter element 16. Filter element 16 may comprise, as shown, a gaseous filter 18 and a particulate filter 20. Filter element 16 is described in more detail below. The filter cartridge's housing 13 surrounds the peripheral surface of the filter element and covers its inflow surface at the periphery.

Filter cartridge 12 can be snapped into engagement with face piece 14 by the steps that consist essentially of pressing the filter cartridge against the face piece in a direction generally normal to the face piece (or parallel to the filter cartridges axis). The cartridge can be secured to the face piece without rotational movement of the cartridge or face piece—although the invention does not necessarily rule out such movement. The cartridge 12 can be quickly removed from the face piece by the steps consisting essentially of grasping the filter cartridge 12 (including an appendage thereto) and pulling thereon axially in a direction away from and normal to the face piece 14. Rotational movement also is not necessary to remove the cartridge from the face piece.

Face piece 14 is sized to fit at least over the nose and mouth of a person. A face piece conceivably could be provided that fits over other portions of a person's face (namely, the eyes), such as in a full face configuration; however, the face piece, as illustrated here, typically is fashioned in a half-mask configuration—that is, one that fits only over the nose and mouth. As shown, face piece 14 may comprise a soft, compliant portion 15 molded in sealing engagement about a rigid central portion 17. The rigid central portion 17 includes an aperture 19 through which filtered air travels to enter the respirator's interior. An inhalation valve can be mounted at 21 as so desired. Respirators having soft, compliant facial portions and rigid central sections onto which the filter cartridge(s) are mounted are known in the art as shown in U.S. Pat. No. 5,062,421.

As shown, the respirator 10 is a "negative pressure" respirator. That is, the respirator relies on the wearer's lungs as the means for drawing air through the respirator. Such respirators are termed "negative pressure" because the pressure inside the respirator is less than ambient during an inhalation. In contrast, "positive pressure" respirators rely on forced air (e.g., from a pressure tank or blower that is carried by the person) to supply oxygen to the wearer, and the pressure inside the respirator is greater than atmospheric. The present invention also may be suitable for use with positive pressure respirators.

When using respirator 10, the negative pressure created by the expansion of the wearer's lungs causes air to be drawn through the filter element 16 in cartridge 12, out an outflow aperture (23, FIGS. 3 and 4) in the filter cartridge 12, and through an inflow aperture (19, FIGS. 3 and 4) in the respirator face piece 14, to enter the face piece's interior where the air can be inhaled by the wearer. Thus, the filter cartridge is disposed in fluid communication with the interior of the respirator face piece.

Figure 4:
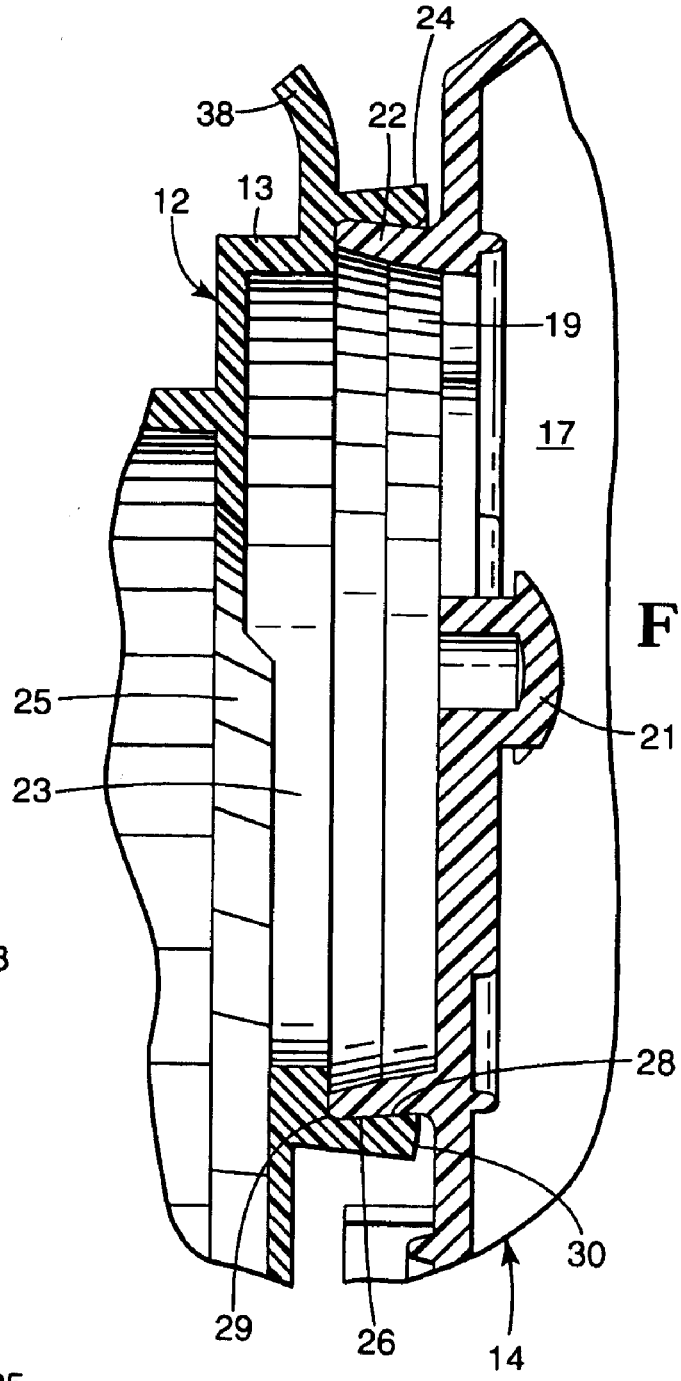
FIG. 4 is an expanded cross-sectional view illustrating the engagement of filter cartridge 12 to face piece 14 in accordance with the invention.

FIGS. 3 and 4 illustrate structurally how filter cartridge 12 can be snap-fitted to face piece 14. Face piece 14 does not include a filter element but includes a cartridge receiving structure in the form of a projecting flange 22 for allowing a filter element to be secured to the face piece 14. As shown, projecting flange 22 engages a skirt 24 on filter cartridge 12. projecting flange 22 preferably has a radially outward projecting surface 26 that engages a radially inward projecting surface 28 on shirt 24. When filter cartridge 12 is pressed axially towards face piece 14, skirt 24 expands radially outward from its rest condition, while projecting flange 22 is pressed radially inward. As filter cartridge 12 continues to be pressed towards face piece 14, radially inward projecting surface 28 passes the maximum radially outward point 29 of radially outward projecting surface 26 allowing skirt 24 to contract inwards and flange 22 to expand outwards. Filter cartridge 12 then snaps into direct engagement with face piece 14. In the attached state, the skirt 24 relaxes to essentially its pre-engaged position but still exerts some pressure against the projecting flange 22—that is, it creates an interference therewith—to provide an essentially air-tight seal between the components. To obtain such an interference, the radially inward projecting surface 28 has a circumference, or in this circular configuration, a diameter that is nominally smaller than the circumference or diameter of the radially outward projecting surface 26. The seal may be accomplished without using a gasket or other suitable sealing mechanism. Thus, when the respirator is worn by a person, inhaled air enters the interior of face piece 14 essentially exclusively by passing from outflow aperture 23 on filter cartridge 12 through inflow aperture 19 on face piece 14. A duct 25 is located behind the filter element to facilitate air flow from the filter element through outflow aperture 23. The outflow and inflow apertures preferably encompass a substantially smaller area (i.e., have a substantially smaller circumference) than the filter element's circumference. The snap-fit hermetic seal may consist essentially of the projecting flange 22 and the skirt 24. Exhaled air can exit the face piece's interior 27 through an exhalation port 31.

The radially inward projecting surface 28 on the inside of skirt 24 may take a variety of forms. For example, the radially inward projecting surface can be, as shown, a surface angled slightly inward (at less than 90°), or it can be in the form of a rib, a bevel, cam, or other inwardly facing projection. When skirt 24 is in a circular configuration, its inner diameter preferably decreases axially in the direction of end 30. The radially outward projecting surface 26 on projecting flange 22 also may come in a variety of forms, including those listed above for skirt 24. Conceivably, projecting flange 22 also can have a groove (not shown) into which a corresponding rib from skirt 24 engages.

Thus, the respirator of the invention includes a snap-fit engagement means that comprises a male member or projecting flange 22 and a female member or skirt 24, wherein during engagement of the filter cartridge 12 to the cartridge receiving structure 22, the projecting flange 22 first compresses and then expands radially outward and the skirt 24 first expands and then radially compresses inward. The compression of the flange 22 and expansion of the skirt 24 preferably occur essentially simultaneously, and the subsequent expansion of the flange 22 and compression of skirt 24 also occur simultaneously. A snap fit also could be achieved by having only one of the flange or skirt expand and contract and by having the other remain essentially static.

The radially outward and inward projecting surfaces 26 and 28 can influence the ease, or conversely the difficulty, of attaching and removing the filter cartridge. Increasing the size of the radially outward and radially inward projecting surfaces 26 and 28 increases the degree to which the skirt 24 is stretched radially outward, which, in turn, can make attachment or removal more difficult. Also, the geometry of surfaces 26 and 28 can influence how gradually or suddenly filter cartridge 12 snaps into position. The material properties of the component parts also is a factor relevant to ascertaining adequate forces for manually attaching and manually separating the parts. What is meant by "manually" is that the filter cartridge can be readily attached and removed from the face piece by use of a person's hands without assistance from any mechanical source separate from the respirator. There is no need for any external tool or instrument or any need to destroy or dismember the respirator to attach or remove the filter cartridge from the face piece. The material properties and other parameters may be adjusted to provide a desirable balance between a snug secure attachment and easy removability. It has been found that a force of 10 to 60 Newtons can provide ease of removability and still provide a secure attachment, and that a removal force of 15 to 25 Newtons is preferred.

Skin 24 preferably is made from a resilient polymeric resin capable of elastic deformation to permit skin 24 to snap over projecting flange 22 and to return its approximate former dimension. Materials with a flexural modulus of $2\times10^8$ to $30\times10^8$ pascals (~30,000 to 400,000psi) at 22° C. (73° F.) may be suitable for this purpose. When the flexural modulus is less than this range, substantial deformation or stretching may be needed to ensure that a good seal is made between the cartridge and the face piece, making it cumbersome to secure the former to the latter. When the flexural modulus is greater than this range, the material may be difficult to deform, making the force required for removal undesirably large and the manufacturing tolerances undesirably narrow. The skin material preferably also is a thermoplastic to facilitate fabrication. Some materials useful for forming a skirt 24 include polyethylene, polypropylene, and thermoplastic rubbers. Low density polyethylene, such as Dowlex™2553 polyethylene (Dow Chemical Company, Midland, Mich.) which has a flexural modulus of $6.6\times10^8$ pascals (~95,000 psi), is a particularly suitable material. High density polyethylene, such as Dow 8454, which has a flexural modulus of $9.5\times10^8$ pascals also is particularly suitable. One embodiment of this invention has an injection molded filter cartridge made of low density polyethylene, a bonded filter element which is compression fit into the cartridge housing, and optionally a particle filter stacked on the bonded filter element. The bonded filter element may be produced in accordance with the teachings of U.S. Pat. Nos. 5,033,465 and 5,078,132 to Braun and Rekow. The particulate filter element can be an electrically-charged fibrous web; see, for example, U.S. Pat. Reissue No. 32,171 or U.S. Pat. Reissue. No. 30,782 to Van Turnhout.

Projecting flange 22 preferably is made from a material that is somewhat stiffer than the skirt material. Materials having a flexural modulus greater than $6\times10^8$ pascals (~95,000 psi) at 22° C. (73° F.) preferably are used to form flange 22. Typically the flange 22 has a flexural modulus of less than $70\times10^8$ pascals (~1,000,000 psi). Examples of suitable materials include acrylonitrile-butadiene-styrene copolymers (ABS), acetals, polycarbonates, polyethylene, polypropylene, polystyrene, et cetera. polypropylene, such as Amoco™ 3234 polypropylene (Amoco Chemical Company, Chicago, Ill.), which is believed to have a flexural modulus of $17\times10^8$ pascals (245,000 psi), is particularly suitable material for use in forming projecting flange 22.

As indicated above, when skin 24 is snapped into engagement with flange 22, there is an audible noise such as a click. An audible noise alerts the user that the cartridge is in position ready for use. A click can be provided when the skirt is stretched beyond a certain limit and then is suddenly relaxed.

Figure 5:
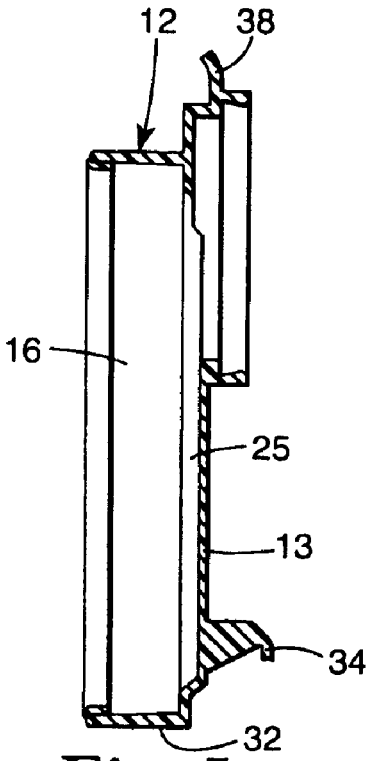
FIG. 5 is a cross-section of a filter cartridge 12 in accordance with the invention.

In some instances, there may be a need to provide an additional securing means beyond the snap fit. The additional securing means may be furnished to assist in preventing accidental dislodgement of the filter cartridge from the face piece such as from an unexpected lateral force. The additional securing means could take the form of a hook 34 shown in FIGS. 3 and 5 disposed laterally from the skin 24 and cartridge receiving structure 22. Hook 34 is insertable into a corresponding slot 36 in face piece 14. Attachment of the filter cartridge 12 to face piece 14 involves first engaging hook 34 in slot 36. Hook 34 then acts as a hinge about which the cartridge 12 pivots as it is pressed generally axially towards or away from face piece 14. A tab 38 can be provided on cartridge 12 to facilitate detaching the cartridge from the face piece 14.

When hook 34 and slot 36 are not employed on filter cartridge 12, the cartridge can be grasped about its periphery to cause its separation from the face piece 14. Leverage is another factor that affects ease or difficulty of filter cartridge attachment or removal. Because the skirt 24 is dimensioned to encompass a smaller area than filter 16 and is not concentric with or offset axially from the center of filter cartridge 16, leverage is available for separating cartridge 12 from face piece 14. As shown, the projected area of the skirt is not encompassed by the projected area of the filter element—that is, the radius of the filter element is less than the sum of the offset plus the radius of the outflow aperture. If hook 34 is disengaged or is not employed, a person grasping filter cartridge 12 can simply pull from end 32 opposite skirt 24 to separate cartridge 12 from face piece 14.

Although the present invention has been illustrated with the face piece 14 having a projecting flange 22 and the filter cartridge 12 having a skirt 24, it may be possible in this invention to do the reverse. That is, alternatively the filter cartridge could be provided with a projecting flange and the face piece could possess the skirt. In lieu of a projecting flange and a skirt, other suitable mechanisms may be envisioned to provide a snap-fit in accordance with this invention. Thus, it is to be understood that the invention is not to be limited to the above-described embodiments but is to be controlled by the limitations set forth in the claims and any equivalents thereof. It also is to be understood that this invention may be practiced in the absence of any limitation or item not explicitly set forth above.

What is claimed is:

1. A respirator that comprises:

(a) a face piece *that is* sized to fit at least over the nose and mouth of a person;

(b) a cartridge receiving structure *that is* located on the face piece; and (c) a filter cartridge that has a housing into which a filter element is contained, the filter cartridge capable of being manually snapped into engagement with the cartridge receiving structure to produce an audible noise, the engagement being instantaneously obtainable by pressing the filter cartridge against the receiving structure without rotational movement *of the filter cartridge relative to the receiving structure, the filter cartridge further being capable of being readily separated from the cartridge receiving structure by pulling manually thereon without additional manual manipulation.*

2. The respirator of claim 1 being a negative pressure respirator.

3. The respirator of claim 1, wherein there is an interference fit between the filter cartridge and the cartridge receiving structure such that an essentially air-tight seal is provided.

4. The respirator of claim 1, wherein the filter cartridge has a flange that has a radially outward projecting surface, and the face piece has a skirt that has a radially inward projecting surface, the radially outward and radially inward projecting surfaces forming an essentially air-tight seal between the cartridge and the face piece during engagement.

5. The respirator of claim 1, including a snap-fit engagement mechanism that comprises a male member and a female member, wherein during engagement of the filter cartridge to the cartridge receiving structure, the female member first expands and then compresses radially inward.

6. The respirator of claim 1, including a snap-fit engagement mechanism that comprises a male member and a female member, wherein during engagement of the filter cartridge to the cartridge receiving structure, the male member first compresses while the female member simultaneously first expands and then the male member expands radially outward while the female member simultaneously compresses radially inward.

7. The respirator of claim 1, wherein the filter cartridge includes a cylindrical housing that contains a cylindrical filter element, the cylindrical filter element being offset axially from the cartridge receiving structure when the filter cartridge is in engagement with the cartridge receiving structure.

8. The respirator of claim 7, wherein the cartridge receiving structure encompasses an aperture having a circumference that is substantially less than the circumference of the cylindrical filter element.

9. The respirator of claim 1, wherein the filter cartridge can be snapped into engagement with the face piece by the steps that consist essentially of pressing the filter cartridge against the face piece in a direction normal to the face piece.

10. The respirator of claim 9, wherein the filter cartridge can be removed from the face piece by the steps consisting essentially of grasping the filter cartridge and pulling thereon axially in a direction normal to the face piece.

11. The respirator of claim 1, wherein the filter cartridge mates with the cartridge receiving structure such that a force of 10 to 60 Newtons is required to remove the filter cartridge from cartridge receiving structure.

12. The respirator of claim 11, wherein 10 to 15 Newtons of force is required to remove the filter cartridge from the cartridge receiving structure.

13. The respirator of claim 1, including a snap-fit engagement mechanism that comprises a male member and a female member, wherein during engagement of the filter cartridge to the cartridge receiving structure the male member first compresses and then expands radially outward.

14. The respirator of claim 13, further including a second engagement mechanism that is located laterally from the snap-fit engagement mechanism.

15. The respirator of claim 13, wherein the snap fit engagement mechanism is offset laterally from the filter element and includes an outflow aperture having a circumference substantially smaller than a circumference of the filter element.

16. The respirator of claim 1, wherein the cartridge receiving structure is in the form of a projecting flange, and wherein the filter cartridge includes a skirt that engages the projecting flange.

17. The respirator of claim 16, wherein the skirt is made from a polymeric resin that has a flexural modulus of $2\times10^8$ to $30\times10^8$ pascals, and wherein the projecting flange is made from a more rigid polymeric material that has a flexural modulus of $6\times10^8$ pascals to $70\times10^8$ pascals.

18. The respirator of claim 16, wherein the projecting flange has a radially outward projecting surface that engages a radially inward projecting surface on the skirt.

19. The respirator of claim 18, wherein the skirt expands radially outward from a rest condition and the projecting flange is pressed radially inward when the filter cartridge is pressed towards the face piece.

20. The respirator of claim 19, wherein the skirt exerts pressure on the projecting flange during engagement to create an essentially airtight seal between the skin and the flange.

[21. A respirator that comprises:

a face piece sized to fit at least over the nose and mouth of a person;

a filter cartridge that includes a housing and a filter element, the filter element being contained within the housing; and a snap-fit engagement mechanism that enables the filter cartridge to be instantaneously and audibly secured to the face piece, the snap-fit engagement mechanism including a male member and a female member, wherein during the snap-fit engagement of the filter cartridge to the face piece the male member initially compresses radially inward while the female member simultaneously initially expands radially outward followed by the male member expanding radially outward while the female member simultaneously compresses radially inward.]

22. A filter cartridge useful for filtering contaminants that are inhaled through a respirator worn by a person and for permitting instantaneous attachment and removal from a cartridge receiving structure on a face piece of the respirator, the filter cartridge comprising a housing and a filter element, the filter element residing in the housing and the housing including a means for allowing the filter cartridge to be manually and audibly snapped into engagement with a cartridge receiving structure by pressing the filter cartridge against a cartridge receiving structure on a face piece without using rotation movement *of the cartridge relative to the receiving structure and for readily separating the filter cartridge from the cartridge receiving structure by pulling manually thereon without additional manual manipulation.*

[23. A respirator that comprises:

a face piece sized to fit at least over the nose and mouth of a person;

a filter cartridge that includes a housing and a filter element, the filter element being contained within the housing; and a snap-fit engagement mechanism that enables the filter cartridge to be instantaneously and audibly secured to the face piece, the snap-fit engagement mechanism including a male member and a female member, wherein during the snap-fit engagement of the filter cartridge to the face piece, the male member initially compresses radially inward while the female member remains essentially static followed by the male member expanding radially outward.]

[24. A respirator that comprises:

a face piece sized to fit at least over the nose and mouth of a person;

a filter cartridge that includes a housing and a filter element, the filter element being contained within the housing; and a snap-fit engagement mechanism that enables the filter cartridge to be instantaneously and audibly secured to the face piece, the snap-fit engagement mechanism including a male member and a female member, wherein during the snap-fit engagement of the filter cartridge to the face piece, the male member remains essentially static while the female member initially expands radially outward followed by compressing radially inward.]

*25. A respirator that comprises:*

*(a) a face piece that is sized to fit at least over the nose and mouth of a person;*

*(b) a cartridge receiving structure that is located on the face piece;*

*(c) a filter cartridge that includes a housing and a filter element, the filter element being contained in the housing; and*

*(d) means for manually snapping the filter cartridge into instantaneous engagement with the cartridge receiving structure to produce an audible noise by pressing the filter cartridge against the receiving structure without rotational movement of the cartridge relative to the receiving structure and for readily separating the filter cartridge from the cartridge structure by pulling manually thereon without additional manual manipulation.*

*26. The respirator of claim 25, wherein the means for manually snapping includes a male member and a female member so configured wherein during the snap-fit engagement of the filter cartridge to the face piece the male member initially compresses radially inward while the female member simultaneously initially expands radially outward followed by the male member expanding radially outward while the female member simultaneously compresses radially inward.*

*27. The respirator of claim 25, wherein the means for manually snapping includes a male member and a female member so configured wherein during the snap-fit engagement of the filter cartridge to the face piece, the male member initially compresses radially inward while the female member remains essentially static followed by the male member expanding radially outward.*

*28. The respirator of claim 25, wherein the means for manually snapping includes a male member and a female member so configured wherein during the snap-fit engagement of the filter cartridge to the face piece, the male member remains essentially static while the female member initially expands radially outward followed by compressing radially inward.*

* * * * *

UNITED STATES PATENT AND TRADEMARK OFFICE

CERTIFICATE OF CORRECTION

PATENT NO. : RE 39,493 E
APPLICATION NO. : 09/030394
DATED : February 27, 2007
INVENTOR(S) : Gregory Yuschak It is certified that error appears in the above-identified patent and that said Letters Patent is hereby corrected as shown below:

Column 2
Line 27, delete “glasses” and insert -- gasses --, therefor.

Column 3
Line 40, delete “first” and insert -- filter --, therefor,

Column 5
Line 14, delete “shirt” and insert -- skirt --, therefor.

Column 6
Line 28, delete “Skin” and insert -- Skirt --, therefor.
Line 29, delete “skin” and insert -- skirt -, therefor.

Column 8
Line 54, in Claim 11, after “from”
insert -- the --.

Column 9
Line 22, in Claim 20, delete “skin” and
insert -- skirt --, therefor.

Signed and Sealed this

First Day of May, 2007

JON W. DUDAS
*Director of the United States Patent and Trademark Office*